(12) United States Patent
Park

(10) Patent No.: US 6,752,353 B2
(45) Date of Patent: Jun. 22, 2004

(54) OPTIMAL CONTROL DESIGN FOR AIRCRAFT ANTISKID BRAKE CONTROL SYSTEMS

(75) Inventor: Duk-Hyun Park, Burbank, CA (US)

(73) Assignee: Hydro-Aire, Inc., Burbank, CA (US)

( * ) Notice: Subject to any disclaimer, the term of this patent is extended or adjusted under 35 U.S.C. 154(b) by 0 days.

(21) Appl. No.: 10/716,696

(22) Filed: Nov. 18, 2003

(65) Prior Publication Data

US 2004/0069902 A1 Apr. 15, 2004

Related U.S. Application Data

(63) Continuation of application No. 09/864,923, filed on May 23, 2001, now Pat. No. 6,659,400.

(51) Int. Cl.$^7$ ............................................. B64C 25/42
(52) U.S. Cl. ...................................................... 244/111
(58) Field of Search ..................... 244/110 R, 110 A, 244/110 H; 303/106, 109, 110, 111, 104

(56) References Cited

U.S. PATENT DOCUMENTS

| | | | | |
|---|---|---|---|---|
| 4,454,582 A | * | 6/1984 | Cleary et al. .................. | 701/15 |
| 4,679,866 A | * | 7/1987 | van Zanten et al. .......... | 303/167 |
| 4,715,662 A | * | 12/1987 | van Zanten et al. .......... | 303/150 |
| 4,764,871 A | * | 8/1988 | van Zanten .................. | 180/179 |
| RE33,486 E | * | 12/1990 | Hirzel et al. .................... | 701/75 |
| 5,141,294 A | * | 8/1992 | Van Zanten et al. .......... | 303/182 |
| 5,172,960 A | * | 12/1992 | Chareire ...................... | 303/191 |
| 5,918,951 A | * | 7/1999 | Rudd, III ................. | 188/181 T |
| 6,132,016 A | * | 10/2000 | Salamat et al. .............. | 303/112 |
| 6,220,676 B1 | * | 4/2001 | Rudd, III ................. | 188/181 T |
| 6,299,262 B1 | * | 10/2001 | Salamat et al. .............. | 303/123 |
| 6,345,872 B2 | * | 2/2002 | Salamat et al. .............. | 303/112 |
| 6,659,400 B2 | * | 12/2003 | Park ............................ | 244/111 |
| 6,684,147 B2 | * | 1/2004 | Park et al. ..................... | 701/71 |
| 2001/0035681 A1 | * | 11/2001 | Salamat et al. .............. | 303/155 |
| 2002/0014800 A1 | * | 2/2002 | Salamat et al. .............. | 303/155 |

* cited by examiner

Primary Examiner—Charles T. Jordan
Assistant Examiner—Stephen A. Holzen
(74) Attorney, Agent, or Firm—Fulwider Patton Lee & Utecht, LLP

(57) ABSTRACT

The optimal control design for antiskid brake control uses a discrete Kalman filter scheme in combination with a conventional aircraft brake control system, comprising sensors for measuring a speed of a wheel and brake torque, and for providing output signals indicative of the speed and torque values, and an optimal antiskid braking controller. The optimal antiskid brake controller includes a wheel speed filter, a reference velocity module, an optimal controller, and an integrator module. The optimal controller includes a discrete Kalman regulator utilizing a discrete Kalman filter, which compels the wheel velocity to quickly converge to the reference velocity, while the integrator produces appropriate antiskidding control and compensates for low frequency torque disturbances. The discrete Kalman filter estimates brake pressure, and the difference between the wheel velocity and a reference velocity, and these estimated states are regulated by a control feedback gain matrix. The weighting matrices and all gains are precalculated, and performance of the controller can be improved by adjustment of these factors. The optimal brake control design methodology can also be applied to an electric brake control system with slight modification of dynamic model parameters, gain values and weighting factors. This optimal brake control scheme provides for improvement of antiskid brake efficiency, and control tuning of a conventional aircraft brake control system.

6 Claims, 3 Drawing Sheets

FIG. 5
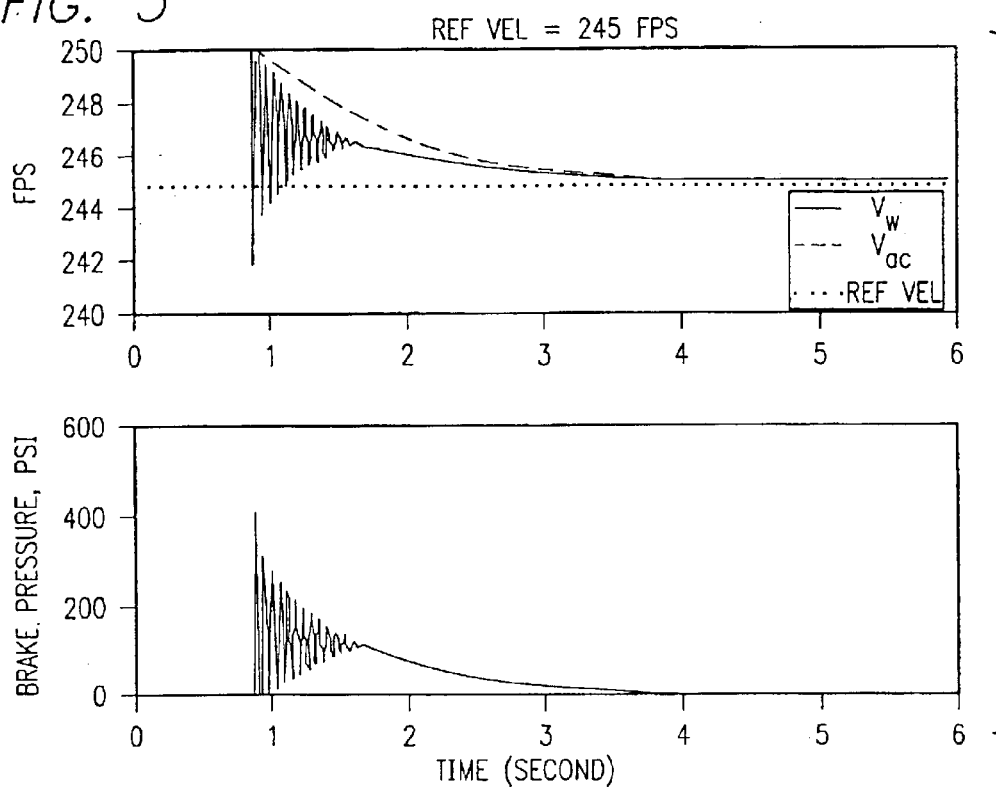
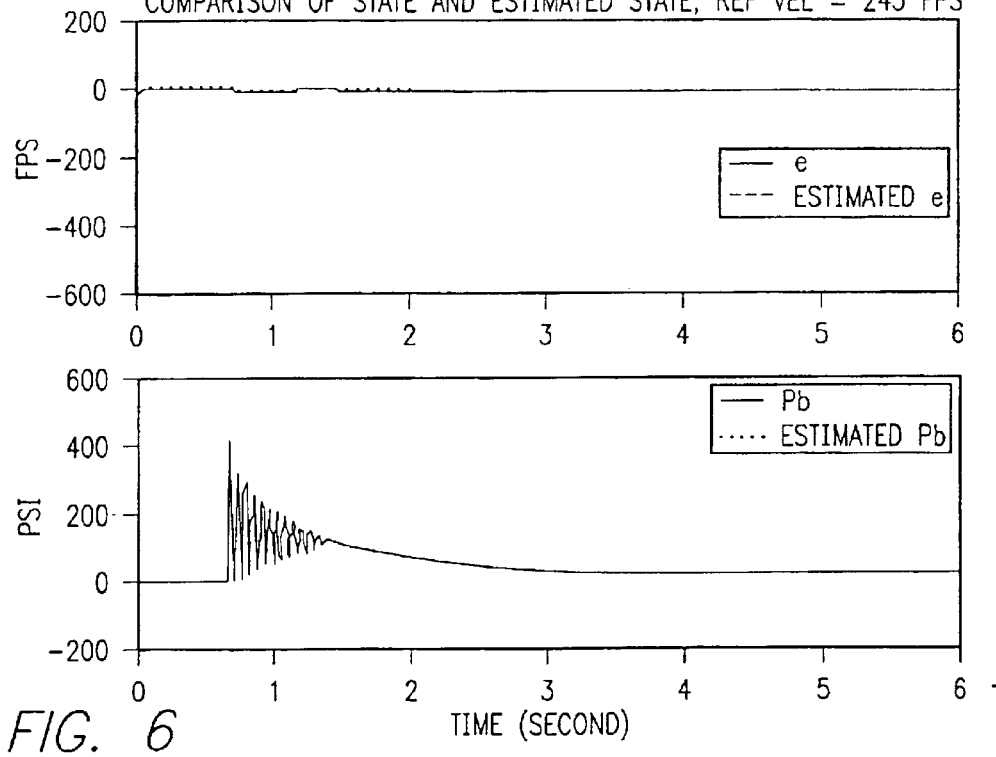
FIG. 6

OPTIMAL CONTROL DESIGN FOR AIRCRAFT ANTISKID BRAKE CONTROL SYSTEMS

RELATED APPLICATIONS

This is a continuation of Ser. No. 09/864,923, filed May 23, 2001 now U.S. Pat. No. 6,659,400.

BACKGROUND OF THE INVENTION

1. Field of the Invention

This invention relates generally to aircraft braking systems, and more particularly concerns a method and system for antiskid control of brake assemblies of an aircraft, utilizing a discrete Kalman filter combined with reference velocity and integrator modules. The present new optimal controller compels the wheel velocity to quickly converge to the reference velocity.

2. Description of Related Art

A conventional skid detection system used in aircraft braking systems typically includes a wheel speed transducer for each wheel brake of the wheels of the aircraft, for measuring wheel speed and generating wheel speed signals that are a function of the rotational speed of the brake wheel. The wheel speed signal is typically converted to a signal representing the velocity of the aircraft, and compared with a desired reference velocity, to generate wheel velocity error signals indicative of the difference between the wheel velocity signals from each braked wheel and the reference velocity signal. The output of the velocity comparator is referred to as velocity error. The velocity error signals are adjusted by a pressure bias modulator (PBM) integrator, a proportional control unit, and a compensation network, and the outputs of these are summed to provide an antiskid control signal received by the command processor. The PBM integrator in the antiskid loop dictates the maximum allowable control pressure level during braking. When no skid is detected, this integrator allows full system pressure to the brakes.

The conventional PID controller for aircraft brake control systems deals with various conditions such as aerodynamics, landing gear dynamics, $\mu$-slip profile, different landing conditions, and the like. One major problem is that tuning of controller parameters to guarantee high efficiency in different landing conditions and conditions affecting the tire-runway coefficient of friction ($\mu$) of the aircraft braking system is often a difficult task.

In the modern state space optimal controller design for the aircraft brake control systems, some efforts to utilize Kalman filter techniques are noted that attempt to provide some advantages such as an estimation of a peak in a mu-slip curve of the tire-runway coefficient of friction, estimation of the optimal slip value, and the like. However, control system observability and controllability continue to be a problem with complex tire-runway $\mu$ conditions, aerodynamics, non-linear landing gear dynamics, various landing conditions, and the like, and successful simulation results have not been demonstrated even in extremely simplified dynamic models. Therefore, it would be desirable to provide a new optimal antiskid brake control method and system implementing an appropriate Kalman type optimal controller to provide an improved antiskid brake efficiency and improved braking control tuning in combination with a conventional PBM integrator for aircraft brake control systems. The present invention meets these and other needs.

SUMMARY OF THE INVENTION

Briefly, and in general terms, the present invention provides for an improved system and method for antiskid braking control implementing an optimal filter control methodology in combination with a conventional PBM aircraft brake integral control system. An optimal antiskid braking controller is provided that includes a wheel speed filter, a reference velocity module, an optimal controller, and a PBM integrator module. The optimal controller includes a discrete Kalman regulator utilizing a Kalman filter, which compels the wheel velocity to quickly converge to the reference velocity, while the integrator module produces appropriate antiskidding control and compensates for low frequency torque disturbances. The optimal controller estimates brake pressure, and the difference between wheel velocity and a reference velocity, and these estimated states are regulated by a control feedback gain matrix. The weighting matrices and all gains are precalculated, and performance of the controller can be improved by adjustment of these factors. The system and method of the invention can also be applied to an electric brake control system with slight modification of dynamic model parameters, gain values and weighting factors. The optimal antiskid braking controller of the invention allows for improvement of antiskid brake efficiency, and improvements in controlled tuning of the conventional PID aircraft brake control system.

The invention accordingly provides for an improvement in a system for controlling braking of an aircraft during landing, the system including wheel velocity signal generating means for producing a wheel velocity signal that is a function of the rotational speed of the wheel, and means for measuring brake torque applied to a wheel brake of the aircraft. Typically, the wheel velocity signal generating means comprises a wheel speed filter for generating a filtered wheel velocity signal based upon the wheel velocity signal. The system for controlling braking of an aircraft during landing includes a velocity reference generator for generating a reference velocity signal indicating a desired reference velocity, aircraft velocity comparison means for comparing the wheel velocity signal with the reference velocity signal for generating a velocity error signal indicative of the difference between the aircraft wheel velocity signal and the reference velocity signal, and an optimal brake controller for generating an optimal brake pressure control signal for the wheel of the aircraft to cause the aircraft wheel velocity to converge to the reference velocity, based upon an estimated command brake pressure and an estimated value of a fictitious coefficient of friction between the tire and runway surface. A pressure bias modulator integrator is provided that is responsive to the wheel velocity signal and the reference velocity signal to provide an antiskid control signal, and means are provided for summing the optimal braking command signal and the antiskid control signal to produce the command brake pressure signal.

In a presently preferred embodiment, the optimal brake controller comprises a discrete Kalman regulator for determining the estimated command brake pressure and the estimated value of the fictitious coefficient of friction. The discrete Kalman regulator, in a preferred aspect of the invention, comprises a control feedback gain matrix and a Kalman filter, the Kalman filter receiving the velocity error signal and a brake torque feedback signal, and the Kalman filter generating an estimated velocity error signal and an estimated brake pressure, and the control feedback gain matrix receives the estimated velocity error signal and the estimated brake pressure to generate the estimated command brake pressure and the estimated value of the fictitious coefficient of friction between the tire and runway surface. In another presently preferred aspect, the optimal brake controller determines the optimal brake pressure control signal based upon the estimated value of the fictitious coefficient of friction between the tire and runway surface, the weight per wheel, the rolling radius of a tire, the reciprocal of the torque vs. pressure ratio, and the estimated command brake pressure.

The present invention similarly provides for an improvement in a method for controlling braking of an aircraft during landing. The method includes the steps of generating a wheel velocity signal that is a function of the rotational speed of a wheel of the aircraft, and applying a command brake torque signal based upon a command brake pressure to the wheel brake of the aircraft. The method also typically involves filtering the wheel velocity signal to generate a filtered wheel velocity signal. A reference velocity signal is generated indicating a desired reference velocity, the wheel velocity signal is compared with the reference velocity signal for generating a velocity error signal indicative of the difference between the aircraft wheel velocity signal and the reference velocity signal, and an optimal brake pressure control signal is generated for the wheels of the aircraft to cause the aircraft wheel velocity to converge to the reference velocity, based upon an estimated command brake pressure and an estimated value of a fictitious coefficient of friction between the wheel and runway. The estimated command brake pressure and the estimated value of the fictitious coefficient of friction are determined with a discrete Kalman regulator, an antiskid control signal is provded; and the optimal braking command signal is summed with the antiskid control signal to produce a command brake pressure signal.

In a presently preferred embodiment of the method, the discrete Kalman regulator comprises a control feedback gain matrix and a Kalman filter, the Kalman filter receives the velocity error signal and a brake torque feedback signal, and the Kalman filter generates an estimated velocity error signal and an estimated brake pressure. The control feedback gain matrix receives the estimated velocity error signal and the estimated brake pressure to generate the estimated command brake pressure and the estimated value of the fictitious coefficient of friction. In a preferred aspect, the step of determining the optimal brake pressure control signal is based upon the estimated value of the fictitious coefficient of friction, the weight per wheel, the rolling radius of a tire, the reciprocal of the torque vs. pressure ratio, and the estimated command brake pressure.

These and other aspects and advantages of the invention will become apparent from the following detailed description and the accompanying drawings, which illustrate by way of example the features of the invention.

BRIEF DESCRIPTION OF THE DRAWINGS

FIG. 5 is a graphical comparison showing the convergence of the wheel velocity and aircraft velocity for B717 parameters using the optimal antiskid braking control system and method of the invention with a reference velocity of 245 fps.

FIG. 6 is a graphical comparison showing the actual and estimated states fort he difference between wheel velocity and reference velocity (e) and brake pressure ($p_b$) for B717 parameters using the optimal antiskid braking control system and method of the invention with a reference velocity of 245 fps.

DETAILED DESCRIPTION OF THE PREFERRED EMBODIMENTS

Figure 1:
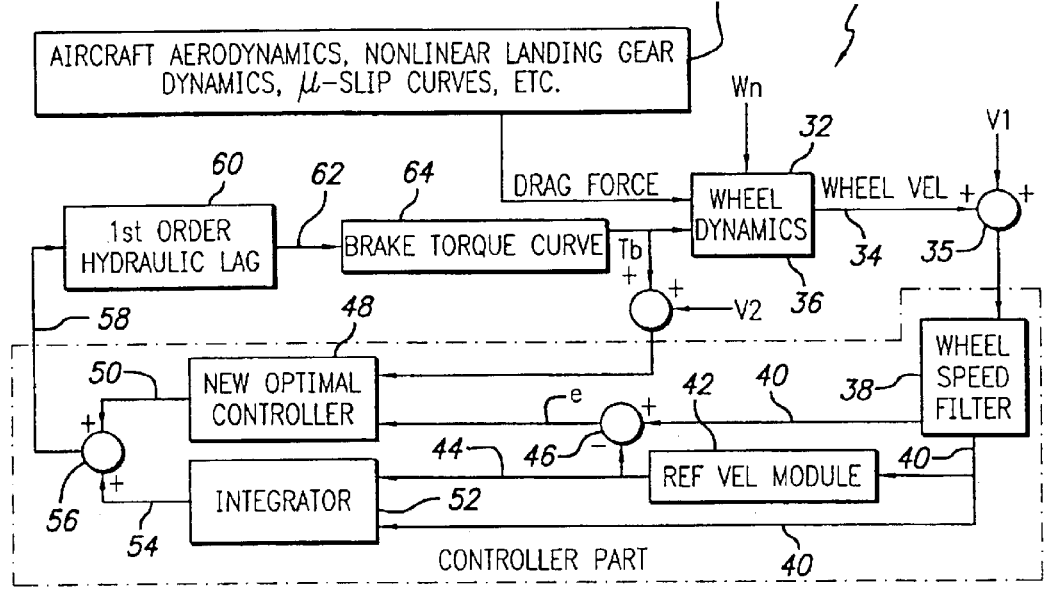
FIG. 1 is a schematic diagram of an optimal antiskid braking control system according to the invention.

While automatic braking systems for commercial aircraft commonly optimize braking efficiency by adapting to runway conditions and other factors, tuning of controller parameters to guarantee high efficiency in different landing conditions and conditions affecting the coefficient of friction ($\mu$) of the aircraft braking system on landing is often difficult. This and other problems concerning complex $\mu$ conditions, aerodynamics, nonlinear landing gear dynamics, various landing conditions can be addressed by an optimal antiskid braking control method and system implementing an optimal filter control methodology according to the present invention.

In the method and system according to the present invention, a brake controller having a new optimal controller utilizing a discrete Kalman control scheme is combined with reference velocity and an integrator module to provide improved brake control for automatic braking systems for commercial aircraft. In general terms, the new optimal controller compels the wheel velocity to quickly converge to the reference velocity, while the integrator produces appropriate skidding control and compensates for low frequency torque disturbances and other extraneous factors. The Kalman filter estimates the two states of brake pressure and a velocity error signal (e) indicative of the difference between the aircraft wheel velocity signal and the reference velocity signal, and these estimated states are regulated by a control feed back gain matrix. This Kalman filter is further developed and constitutes a new optimal controller with manipulation of a fictitious coefficient of friction ($\mu$) between the tire and runway surface. The weighting matrices and all gains are precalculated and performance of the controller is improved by adjustment of these factors. Although an exemplary first order hydraulic model is described for use with a discrete Kalman regulator utilizing a Kalman filter, as well as with wheel dynamics, the system and method of the invention are applicable to real time hydraulic brake systems. The invention can also be applied to an electric brake control system with slight modification of dynamic model parameters, gain values and weighting factors.

The terms and definitions set out below in Table 1 are used herein with reference to the equations set out herein.

TABLE 1

Definitions

| Term | Definition |
| --- | --- |
| Iw | mass moment of inertia of a tire/wheel/brake |
| $w_n$ | dynamic model white noise |
| Wt | weight per wheel |
| Kr | ratio of torque to pressure |
| $r_t$ | rolling radius of a tire |
| K | control feedback gain matrix |
| ref vel | reference velocity |
| wheel vel | wheel velocity |
| e | wheel vel - ref vel |
| x1e: | estimated e |
| $p_b$ | brake pressure |
| x2e: | estimated $p_b$ (brake pressure) |

TABLE 1-continued

Definitions

| Term | Definition |
|---|---|
| Tb: | brake torque |
| v1, v2: | measurement white noise |
| $p_c$ | command brake pressure |
| $p_c^*$ | command brake pressure produced by the Kalman regulator |
| $\mu$ | coefficient of friction between the tire and runway surface |
| $\mu^*$ | fictitious $\mu$ value produced by the Kalman regulator |

As is illustrated in the drawings, the invention is embodied in an improved system 30 for controlling braking of an aircraft during landing. Referring to FIG. 1, the system includes a wheel velocity signal generating means 32, such as a wheel speed transducer, for example, for producing a wheel velocity signal 34 that is a function of the rotational speed of an aircraft wheel, and means 36 for applying a command brake torque signal based upon a command brake pressure to a wheel brake of the aircraft. A brake torque and/or brake pressure transducer (not shown) is also preferably provided for providing a feedback measurement of one or both of these parameters. A measurement white noise (v1) is also an input and summed with the wheel velocity signal by summer 35. The means for applying a command brake torque signal typically includes a brake control valve that controls the application of pressurized brake fluid from system pressure to the wheel brake, and may include an amplifier to provide an amplified brake control signal applied to the brake control valve. In a presently preferred embodiment, the wheel velocity signal generating means 32 further comprises a wheel speed filter 38 for generating a filtered wheel velocity signal 40 based upon the wheel velocity signal.

The improved system for controlling braking of an aircraft during landing includes a velocity reference generator 42 for generating a reference velocity signal 44 indicating a desired reference velocity. Aircraft velocity comparison means 46 are provided for comparing the wheel velocity signal, which is preferably the filtered wheel velocity signal 40, with the reference velocity signal 44 for generating a velocity error signal (e) indicative of the difference between the aircraft wheel velocity signal and the reference velocity signal. An optimal brake controller 48 is provided for generating an optimal brake pressure control signal 50 for the wheel of the aircraft to cause the aircraft wheel velocity to converge to the desired reference velocity 44, based upon an estimated command brake pressure ($p_c^*$) and an estimated value of a fictitious coefficient of friction ($\mu^*$) between the tire and runway surface. A pressure bias modulator integrator 52 is provided that is responsive to the wheel velocity signal, which is preferably the filtered wheel velocity signal 40, and the reference velocity signal 44 to provide an antiskid control signal 54. Means 56 are also provided for summing the optimal brake pressure control signal 50 and the antiskid control signal 54 to produce a command brake pressure signal 58. The command brake pressure signal 58 is also typically amplified by valve amplifier 60 that compensates for a first order hydraulic lag, to provide an amplified brake control signal 62 applied to the brake control valve 64 that controls the application of pressurized brake fluid from system pressure to the wheel brake according to a reference brake torque curve correlating the amplified brake control signal to the corresponding brake torque (Tb) to be applied to the wheel brakes. In a presently preferred embodiment, these functions can be performed by one or more microprocessors under appropriate software control, although alternatively these or analogous functions may be performed by suitable hardware components. Reference information 66 concerning aircraft aerodynamics, nonlinear landing gear dynamics, $\mu$-slip curves and the like for determining an ultimate drag force to be provided by the wheel braking, and dynamic model white noise ($w_n$) may also be input to the means for applying a noisy brake torque signal and a noisy wheel velocity signal.

Figure 2:
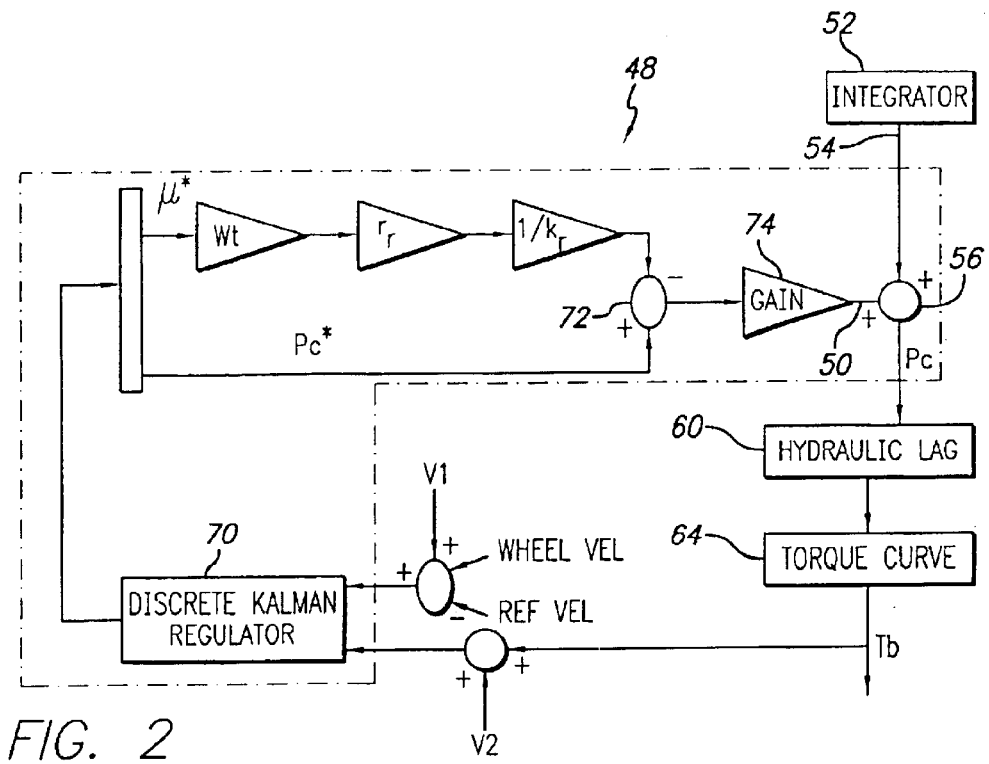
FIG. 2 is a schematic diagram of an optimal controller for determining an optimal brake pressure control signal for the optimal antiskid braking control system of FIG. 1.
Figure 3:
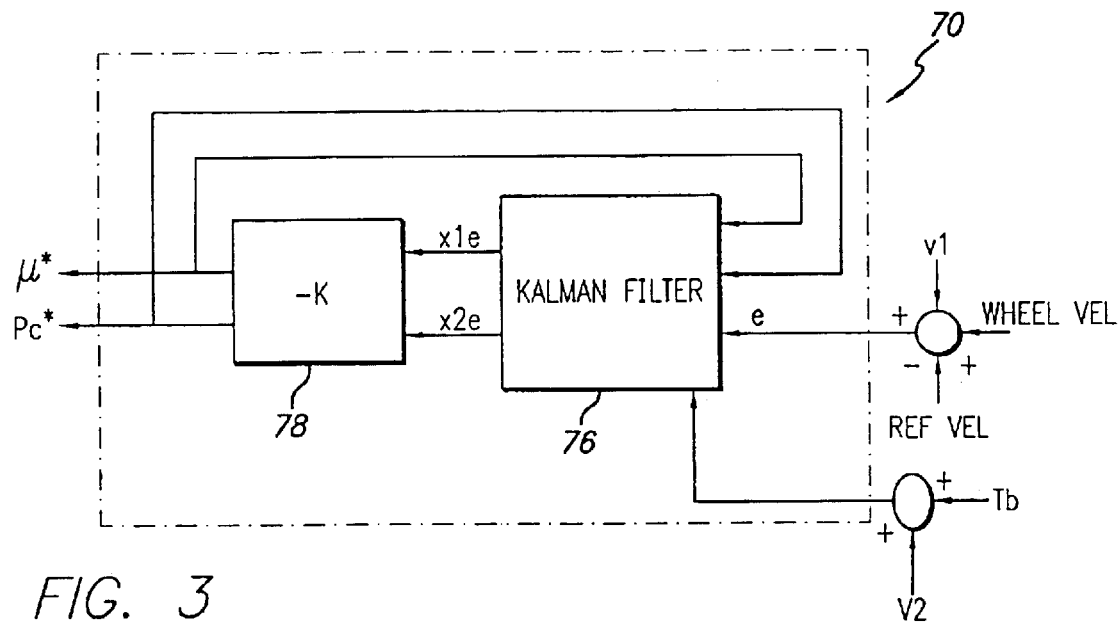
FIG. 3 is a discrete Kalman regulator of the optimal controller of FIG. 2.

As is illustrated in FIGS. 2 and 3, in a presently preferred embodiment, the optimal brake controller 48 comprises a discrete Kalman regulator 70 that determines the estimated command brake pressure ($p_c^*$) and the estimated value of the fictitious coefficient of friction ($\mu^*$), based upon input of to the discrete Kalman regulator of the brake torque signal (Tb), which may be summed with a measurement white noise (v2) for the discrete Kalman regulator, as well as the wheel velocity signal, which is preferably the filtered wheel velocity signal, the reference velocity signal, and measurement white noise (v1). In the optimal brake controller, the fictitious coefficient of friction ($\mu^*$) is preferably adjusted by such factors as the weight per wheel (Wt), rolling radius of tire (rr), and the reciprocal of the ratio (Kr) of torque vs. pressure, and is summed by summer 72 with the estimated command brake pressure ($p_c^*$), and amplified at 74 by a gain factor to determine the command brake pressure ($p_c$).

With reference to FIG. 3, the discrete Kalman regulator, in a preferred aspect of the invention, comprises a Kalman filter 76 that receives the velocity error signal (e), which may contain the measurement white noise (v1), and the brake torque signal (Tb), which may contain the measurement white noise (v2), as well as feedback of the signal outputs of the discrete Kalman regulator, the estimated command brake pressure ($p_c^*$) and the estimated value of the fictitious coefficient of friction ($\mu^*$) between the tire and runway surface. The Kalman filter generates an estimated velocity error signal (x1e) and an estimated brake pressure signal (x2e), which are received by a control feedback gain matrix 78 and which in turn based upon these inputs determines the estimated command brake pressure ($p_c^*$) and the estimated value of the fictitious coefficient of friction ($\mu^*$) between the tire and runway surface.

A state equation of wheel dynamics used to design a Kalman filter utilized according to the present invention is as follows:

$$\dot{\omega} = \left[\frac{Wt \cdot r_r}{Iw}, -\frac{1}{Iw}\right]\left\{\begin{array}{c}\mu \\ Tb\end{array}\right\}$$

$$\omega = [1]\omega + [0\ 0]\left\{\begin{array}{c}\mu \\ Tb\end{array}\right\}$$

where $\omega$ is wheel angular velocity (rad/sec); $\mu$ is coefficient of friction between the tire and runway surface; Tb is brake torque; Wt is weight per wheel; $r_r$ is rolling radius of a tire; and Iw is mass moment of inertia of a tire/wheel/brake. The parameters Wt, $r_r$, and Iw are assumed to be constants for the design of a Kalman regulator.

A first order hydraulic brake pressure lag model maybe described by the following equation:

$$\dot{p}_b = \frac{1}{\tau}[p_c - p_b]$$

where $p_b$ is brake pressure; $p_c$ is brake command pressure; $\tau$ is time delay ($1\times10^{-3}$ seconds). The torque vs. pressure ratio (Kr) is assumed to be constant for the design of a Kalman regulator.

Figure 4:
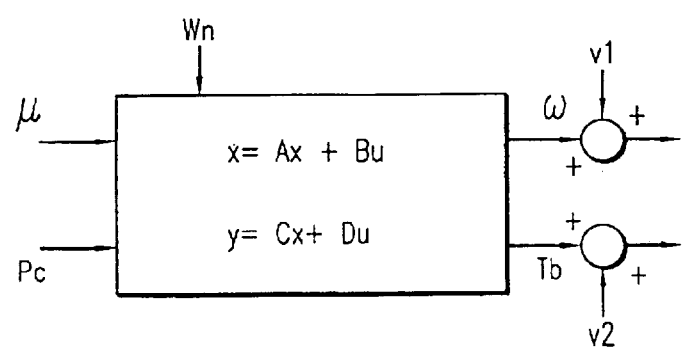
FIG. 4 is an augmented linearized state equation for the optimal antiskid braking control system of FIG. 1.

An augmented linearized state equation from the above equations and assumption is illustrated in FIG. 4, in which the two states (x) are ω (wheel angular velocity) and $p_b$ (brake pressure) or Tb (brake torque), $w_n$ is dynamic model white noise, and v is output measurement white noise. For example, given B-717 parameters and Kr (torque vs. pressure ratio)=20, the augmented state equation is:

$$\dot{x} = \begin{bmatrix} 0 & -2.2272 \\ 0 & -1000.0 \end{bmatrix} x + \begin{bmatrix} 4.0461e3 & 0 \\ 0 & 1.0e3 \end{bmatrix} u$$

$$y = \begin{bmatrix} 1 & 0 \\ 0 & 20 \end{bmatrix} x + \begin{bmatrix} 0 & 0 \\ 0 & 0 \end{bmatrix} u$$

The plant model may be converted to a discrete time model of Ts=5 ms (sampling time) to design a discrete Kalman filter, according to the following equations:

$$x(k+1)=A \cdot x(k)+B \cdot u(k)+B1 \cdot w_n(k)$$

$$y(k)=C \cdot x(k)+D \cdot u(k)+v(k)$$

In the design of a Kalman filter, the noise covariance data are given by the following equations:

$$E(w_n(k)w_n^T(k))=Q \cdot \delta_{jk}$$

$$E(v(k)v^T(k))=R \cdot \delta_{jk}$$

$$E(w_n(k)v^T(k))=N \approx 0$$

where E(.) is a mathematical expectation operation, and $\delta_{jk}$ is the Kronecker delta function.

The Kalman filter equation thus becomes as follows:

$$q(k)=\lfloor A-L(k)CA \rfloor q(k-1)+\lfloor B-L(k)CB \rfloor u(k-1)+L(k)y(k)$$

where q(k) provides the estimated states (x1e, x2e) at k instant.

The Kalman gain matrix L is precalculated, and the control feedback gain matrix K is also precalculated separately, according to Duality and Separation property (Linear System Theory and Design, Chen, 1984).

Referring to FIG. 3, the $\mu^*$ and $p_c^*$ are control efforts produced by the Kalman regulator. The term $p_c^*$ is a brake command pressure; the term $\mu^*$ is a fictitious $\mu$ value that can not be controlled by the controller. This value is incorporated into the brake command pressure as is illustrated in the new optimal controller as is illustrated in FIG. 2.

In FIGS. 5 and 6, the reference velocity (REF VEL) of 245 fps is injected from an external source. The wheel velocity and aircraft velocity quickly converge to the constant reference velocity (245 fps). As is illustrated in FIG. 6, where e=wheel velocity minus reference velocity, and $p_b$ is the brake pressure, the estimated e and estimated $p_b$ through the Kalman filter are in close agreement with actual e and actual $p_b$ values, respectively. The e values (e and estimated e) quickly diminish, so that the wheel velocity quickly follows the reference velocity.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. In a system for controlling braking of an aircraft during landing, said system including wheel velocity signal generating means for producing a wheel velocity signal that is a function of the rotational speed of a wheel and an associated tire of the aircraft, and means for generating a command brake pressure signal for controlling a command brake pressure to a wheel brake of the aircraft, means for generating a reference velocity signal indicating a desired reference velocity, means for comparing said wheel velocity signal with said reference velocity signal for generating a velocity error signal indicative of the difference between said aircraft wheel velocity signal and said reference velocity signal, a brake controller for generating a brake pressure control signal for the wheel of the aircraft to cause the aircraft wheel velocity to converge to said reference velocity, based upon an estimated command brake pressure and an estimated value of a coefficient of friction between the tire and runway surface, and means for providing an antiskid control signal, the improvement comprising:

means for summing said brake pressure control signal and said antiskid control signal to produce said command brake pressure signal.

2. The system of claim 1, wherein said brake controller comprises a discrete Kalman regulator for determining the estimated command brake pressure and the estimated value of the coefficient of friction between the tire and runway surface.

3. The system of claim 2, wherein said discrete Kalman regulator comprises a control feedback gain matrix and a Kalman filter, said Kalman filter receiving said velocity error signal and a brake torque feedback signal, and said Kalman filter generating an estimated velocity error signal and an estimated brake pressure, and said control feedback gain matrix receives said estimated velocity error signal and said estimated brake pressure to generate said estimated command brake pressure and the estimated value of the coefficient of friction between the tire and runway surface.

4. In a method controlling braking of an aircraft during landing, the method including the steps of generating a wheel velocity signal that is a function of the rotational speed of a wheel and an associate tire of the aircraft, and applying a command brake torque signal based upon a command brake pressure to the wheel brake of the aircraft, generating a reference velocity signal indicating a desired reference velocity, comparing said wheel velocity signal with said reference velocity signal for generating a velocity error signal indicative of the difference between said aircraft wheel velocity signal and said reference velocity signal, generating a brake pressure control signal for the wheel of the aircraft to cause the aircraft wheel velocity to converge to said reference velocity, based upon an estimated command brake pressure and an estimated value of a coefficient of friction between the tire and runway surface, and providing an antiskid control signal, the improvement in the method comprising the step of:

summing said brake pressure control signal and said antiskid control signal to produce a command brake pressure signal.

5. The method of claim 4, wherein said step of generating a brake pressure control signal comprises determining the estimated command brake pressure and the estimated value of the coefficient of friction with a discrete Kalman regulator.

6. The method of claim 5, wherein said discrete Kalman regulator comprises a control feedback gain matrix and a Kalman filter, said Kalman filter receiving said velocity error signal and a brake torque feedback signal, said Kalman filter generates an estimated velocity error signal and an estimated brake pressure, and said control feedback gain matrix receives said estimated velocity error signal and said estimated brake pressure to generate said estimated command brake pressure and the estimated value of the coefficient of friction between the tire and runway surface.

* * * * *